V. DUFF.
SELF OILING WHEEL.
APPLICATION FILED MAR. 2, 1908.
No. 898,851.
Patented Sept. 15, 1908.
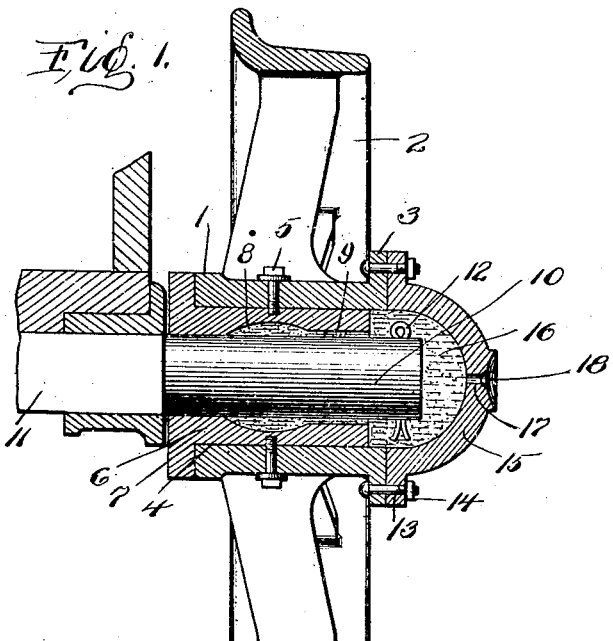
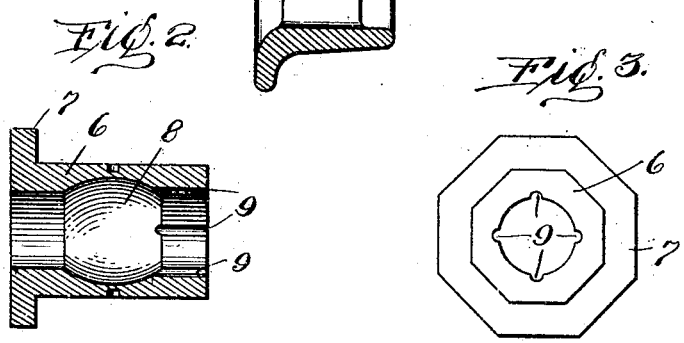
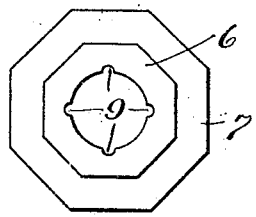
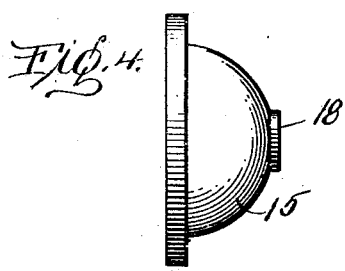
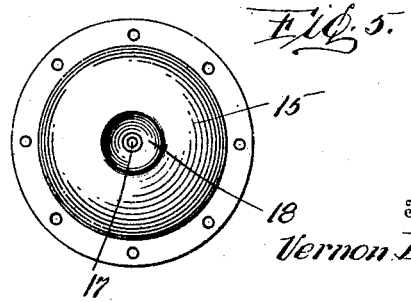
Witnesses
Samuel Payne
X. A. Butler
Inventor
Vernon Duff
By H. C. Evert
Attorneys

UNITED STATES PATENT OFFICE.

VERNON DUFF, OF BURNSIDE, PENNSYLVANIA.

SELF-OILING WHEEL.

No. 898,851.     Specification of Letters Patent.     Patented Sept. 15, 1908.

Application filed March 2, 1908. Serial No. 418,781.

*To all whom it may concern:*

Be it known that I, VERNON DUFF, a citizen of the United States of America, residing at Burnside, in the county of Clearfield and State of Pennsylvania, have invented certain new and useful Improvements in Self-Oiling Wheels, of which the following is a specification, reference being had therein to the accompanying drawing.
This invention relates to self oiling wheels, and the primary object of my invention is, to provide a novel lubricant receptacle for automatically supplying a lubricant to the spindle on the end of an axle.
Another object of this invention is to provide a simple and inexpensive lubricator which will form part of the hub of a wheel.

A further object of this invention is to provide a novel lubricant bath for the spindle of an axle, thereby insuring an easy rotation of a wheel upon the axle.

With the above and other objects in view, the invention consists in the novel construction to be presently described and then specifically pointed out in the appended claims.

Referring to the drawing forming part of this specification:—Figure 1 is a vertical sectional view of a wheel constructed in accordance with my invention. Fig. 2 is a longitudinal sectional view of a sleeve forming part of my invention. Fig. 3 is an end view of the same. Fig. 4 is a side elevation of a cap forming part of my invention, and Fig. 5 is an end view of the same.
To put my invention into practice, I provide a hub 1 of a wheel 2 with a peripheral flange 3 upon its outer end, and with an octagonal shaped bore 4. In the bore 4 is secured by screws 5 an octagonal shaped sleeve 6 having a flange 7 on one end thereof, this flange resting against the inner end of the hub 1.

The sleeve 6 intermediate of its ends is formed with an interior concavity 8, and the outer end of said sleeve is formed with a plurality of longitudinally disposed grooves 9, the object of which will presently appear. The sleeve 6 is adapted to rest upon the spindle 10 of an axle 11, said spindle being retained in the sleeve 6 by a cotter pin 12.

Secured to the peripheral flange 3 by bolts 13 and nuts 14 is a semi spherical cap 15 forming a lubricant space or receptacle 16 at the end of the spindle 10. The cap is provided with a port 17 adapted to be closed by a plug 18.

The lubricant which I use in connection with my invention is a heavy oil, which is injected into the receptacle 16 through the port 17. From the receptacle 16 the lubricant is adapted to pass through the grooves 9 into the annular concavity 8 of the sleeve 6, and maintains the spindle 10 in a lubricant bath.

It is apparent from the foregoing description that I have devised a novel device for thoroughly lubricating the spindle of an axle, whereby a wheel will freely revolve thereon.

Having now described my invention, what I claim as new, is;—

A self oiling wheel comprising a wheel hub provided at the outer end with a flange, a sleeve fitting within the bore of the hub and having a flange on its inner end abutting against the inner end of the hub, said sleeve provided approximately midway its length with an interior annular groove and having a plurality of interior longitudinal grooves leading from the annular groove to the outer end of the sleeve, means passed through the periphery of the hub and engaging the sleeve to hold it against longitudinal movement in the hub, and a cap having a flange fitted with and bolted to the flange on the outer end of the hub, said cap having a central filling port, and a plug normally closing said filling port.

In testimony whereof I affix my signature in the presence of two witnesses.

VERNON DUFF.

Witnesses:
    C. E FIGARD,
    GEO. A. MCCAULLEY,